United States Patent [19]

Garde et al.

[11] Patent Number: 5,278,882
[45] Date of Patent: Jan. 11, 1994

[54] ZIRCONIUM ALLOY WITH SUPERIOR CORROSION RESISTANCE

[75] Inventors: Anand M. Garde, West Simsbury; Satya R. Pati, Simsbury, both of Conn.

[73] Assignee: Combustion Engineering, Inc., Windsor, Conn.

[21] Appl. No.: 998,674

[22] Filed: Dec. 30, 1992

[51] Int. Cl.$^5$ .............................................. G21C 3/00
[52] U.S. Cl. .................................. 376/416; 376/414; 376/417; 427/6; 427/239
[58] Field of Search ............... 376/409, 416, 414, 417; 427/6, 239

[56] References Cited

U.S. PATENT DOCUMENTS

| | | | |
|---|---|---|---|
| 4,648,912 | 3/1987 | Sabol et al. | 148/11.5 F |
| 4,649,023 | 3/1987 | Sabol et al. | 420/422 |
| 4,664,831 | 5/1987 | Hibst et al. | 252/62.59 |
| 4,675,153 | 6/1987 | Boyle et al. | 376/416 |
| 4,879,093 | 11/1989 | Garde | 420/422 |
| 4,938,920 | 7/1990 | Garzarolli et al. | 376/457 |
| 4,963,323 | 10/1990 | Matsuo et al. | 420/422 |
| 4,992,240 | 2/1991 | Komatsu et al. | 420/422 |
| 5,023,048 | 6/1991 | Mardon et al. | 376/416 |
| 5,112,573 | 5/1992 | Foster et al. | 420/422 |
| 5,125,985 | 6/1992 | Foster et al. | 148/672 |

OTHER PUBLICATIONS

Isobe, T. and Matsuo, Y., "Development of High Corrosion Resistant Zirconium-base Alloys", Zirconium in the Nuclear Industry: Ninth International Symposiu, ASTM STP 1132, C. M. Eucken and A. M. Garde, Eds. American Society for Testing Materials, Philadelphia, 1991, pp. 346-367.
Burton, B., Donaldson, A. T., and Reynolds, G. L., "Interaction of Oxidation and Creep in Zircaloy-2", ASTM STP 681, 1979, pp. 561-585.
Adamson, R. B., and Bell, W. L., "Effects of Neutron Irradiation and Oxygen Content on the Microstructure and Mechanical Properties of Zircaloy", Microstructural and Mechanical Behavior of Materials, vol. 1, G. Haicheng and H. Jiawen, Editors; Engineering Materials Advisory Services, UK 1985 pp. 237-246.
Eucken C. M., Finden, P. T., Trapp-Pritsching, S. and Weidinger, H. G., "Influence of Chemical Composition on Uniform Corrosion of Zicronium Base Alloy in Autoclave Tests" Zicronium in the Nuclear Indutry Eighth International Symposium, ASTM STP 1023, L.F.P., Van Swam and C. M. Eucken, Eds.; American Society for Testing and Materials, Philadelphia, 1989, pp. 113-127.
McInteer, W. A., Baty, D. L. and Stein, K. O., "The Influence of Tin Content on the Thermal Creep of Zircaloy-4", Zirconium in the Nuclear Industry, Eighth International Symposium, ASTM STP 1023, L. F. P. Van Swam and C. M. Eucken, Eds.; American Society for Testing and Materials, Philadelphia, 1989 pp. 621-640.
Scott, D. B., "Notes on the Corrosion Behavior of Zircaloy-2 with Various Levels of Iron Content," Zirconium Highlights, WAPD-ZH-24, p. 11, (1960).

Primary Examiner—Donald P. Walsh
Assistant Examiner—Frederick H. Voss
Attorney, Agent, or Firm—Ronald P. Kananen; John H. Mulholland

[57] ABSTRACT

A stabilized alpha metal matrix provides an improved ductility, creep strength, and corrosion resistance against irradiation in a zirconium alloy containing on a weight percentage basis tin in a range of 0.4 to 1.0 percent, and typically 0.5; iron in a range of 0.3 to 0.6 percent, and typically 0.46 percent; chromium in a range of 0.2 to 0.4 percent, and typically 0.23 percent; silicon in a range of 50 to 200 ppm, and typically 100 ppm; and oxygen in a range 1200 to 2500 ppm, typically 1800 to 2200 ppm. The high oxygen level assists in reducing hydrogen uptake of the alloy compared to Zircaloy-4, for example.

21 Claims, No Drawings

ZIRCONIUM ALLOY WITH SUPERIOR CORROSION RESISTANCE

BACKGROUND OF THE INVENTION

This invention relates to alloys for use in light water nuclear reactor (LWR) core structural components and fuel cladding. More particularly, this invention relates to a zirconium alloy for such use which exhibits superior ductility, creep strength, and corrosion resistance after irradiation. Still more particularly, this invention relates to a zirconium alloy with improved creep strength, corrosion resistance, and low neutron absorption cross section by controlling its alloy composition to within particular ranges, and especially including oxygen in particularly high ranges, thus to assist in reducing hydrogen uptake of the proposed alloy.

DESCRIPTION OF THE PRIOR ART

Zirconium alloys are used in the fuel assembly structural components of nuclear reactors, such as in fuel rod cladding, guide or thimble tubes, grid strips, instrument tubes, and so forth because of their low neutron cross section, good corrosion resistance in high pressure/high temperature steam and water, good mechanical strength and fabricability. Zirconium alloys, particularly those commonly known as Zircaloy-2 and Zircaloy-4 have been used in light water reactor cores because of their relatively small capture cross section for thermal neutrons. The addition of 0.5 to 2.0 percent by weight niobium and up to 0.25 percent of a third alloying element to these zirconium alloys for purposes of corrosion resistance in the reactor core is suggested in U.S. Pat. No. 4,649,023 as part of a teaching of producing a microstructure of homogeneously dispersed fine precipitates of less than about 800 angstroms. The third alloying element is a constituent such as iron, chromium, molybdenum, vanadium, copper, nickel and tungsten.

Pellet-clad interaction (PCI) resistance is sought in U.S. Pat. Nos. 4,675,153 and 4,664,831 by use of zirconium-based alloys including "zirconium-2.5 w/o niobium". The latter teaching also refers to "Zr-Nb alloys containing about 1.0 to 3.0 w/o Nb". In these patents, oxygen is present "below about 350 ppm of said alloy".

U.S. Pat. No. 4,648,912 teaches improving high temperature corrosion resistance of an alpha zirconium alloy body by rapidly scanning the surface of the body with a laser beam. The alloy treated included zirconium-niobium alloys. Thus, it has been found by various investigators in the prior art literature that the addition of niobium to a zirconium alloy for use in light water reactors will reduce hydrogen uptake from waterside corrosion, stabilize alloying element and oxygen-irradiation defect complexes, and make the alloy more resistant to annealing of irradiation damage. It is also reported by investigators that niobium will enhance work hardenability of irradiated Zircaloy but that an addition of niobium above the 1 percent level will not result in further additional benefit in mechanical properties.

An improved ductile irradiated zirconium alloy is described in U.S. Pat. No. 4,879,093 issued to an inventor in this application. The alloy has a stabilized microstructure which minimizes loss of alloy ductility required to resist release of fission gases and to handle spent fuel safely. The alloy retains a reasonable corrosion resistance in both pressurized water reactors (PWR) and boiling water reactors (BWR) because of its optimum intermetallic precipitate average particle size. The alloy of the '093 patent is based on an alpha phase zirconium-tin-niobium or alpha phase zirconium-tin-molybdenum alloy having characteristics as shown in Table 1 of that patent with niobium, if present, in a range of from a measurable amount up to 0.6 percent by weight. The molybdenum, if present, is in a range of from a measurable amount up to 0.1 percent by weight. The zirconium-tin system is known as "Zircaloy" and, typically, if Zircaloy-4, for example, would also have 0.18 to 0.24 percent by weight iron, 0.07 to 0.13 percent by weight chromium, oxygen in the range of from 1000 to 1600 ppm, 1.2 to 1.7 percent by weight tin, and the remainder zirconium.

U.S. Pat. No. 4,992,240 discloses another zirconium alloy containing on a weight basis, 0.4 to 1.2% tin, 0.2 to 0.4% iron, 0.1 to 0.6% chromium, not higher than 0.5% of niobium, and balance zirconium, wherein the sum weight proportions of tin, iron and chromium is in the range of 0.9 to 1.5%. Oxygen, according to FIG. 4 of the '240 patent, is about 1770 ppm to 1840 ppm. Niobium is apparently optional, and silicon is not reported.

Recent trends in the nuclear industry include shifts toward higher coolant temperatures to increase the thermal efficiency and toward higher fuel discharge burnups to increase the fuel utilization. Both the higher coolant temperatures and discharge burnups tend to increase the in-reactor corrosion and hydrogen uptake of the zirconium alloys. The high levels of neutron fluence and simultaneous hydrogen pickup degrade the ductility of zirconium alloys. For these more demanding service conditions, it is therefore necessary to improve the corrosion resistance and irradiated ductility of zirconium alloys.

Accordingly, it is a continuing problem in this art to develop a zirconium alloy having superior ductility after irradiation; good corrosion resistance, especially independent of processing history; reduced hydrogen absorption by the alloy; and a significant solid solution alloy strength.

It is another continuing general problem in this art to improve the corrosion resistance and irradiated ductility of zirconium alloys used in fuel assembly structural components in nuclear reactors.

It is another continuing general problem in this art to provide a zirconium alloy which has superior creep resistance, superior corrosion resistance, and low neutron absorption cross section by the selection of alloying elements in particular ranges.

It is another continuing general problem in this art to provide a zirconium alloy with selected alloying elements to assist in reducing hydrogen uptake of the alloy.

DESCRIPTION OF THE PREFERRED EMBODIMENTS

It is an object of this invention, therefore, to provide a zirconium alloy with improved creep resistance.

It is another object of this invention to provide a zirconium alloy with improved corrosion resistance.

It is an additional object of this invention to provide. a zirconium alloy with a low neutron absorption cross section It is still another object of this invention to provide a zirconium alloy with reduced hydrogen absorption.

In order to improve corrosion resistance of zirconium alloys, a decrease in tin levels below the normal Zircaloy-4 allowed minimum level of 1.2 wt. % may be used, but with a simultaneous degradation of its creep resistance. The thermal creep resistance can be improved by the addition of strengthening elements such as niobium or oxygen, as well as with iron, chromium, and nickel. Since the thermal neutron absorption cross section for oxygen is lower than that for niobium, the addition of oxygen with low neutron cross section is preferred.

Another advantage of oxygen addition compared to the niobium addition may be a better high temperature strength with oxygen addition. While a niobium addition deceases the $\alpha/(\alpha+\beta)$ transition temperature, oxygen addition increases the transition temperature. As a result, better high temperature strength (applicable to LOCA calculations) is expected with the oxygen addition.

The use of oxygen as an alloying element to increase the strength of unirradiated zirconium alloys is a known idea. However, the addition of oxygen also degrades the fabricability of the zirconium alloys and therefore the oxygen level in commercial zirconium alloys is generally limited to about 1600 ppm. The effect of oxygen on the mechanical properties of irradiated zirconium alloys has not been considered in the past in alloy composition optimization. Thus, the alloy of this invention is based on a combined optimization of cladding corrosion resistance, fabricability, hydrogen uptake, and in-reactor creep resistance.

Moreover, the addition of silicon has been proposed in the prior pending U.S. patent application of the inventors of this application, Ser. No. 761,509 (ABB-010, C910440).

The improved alloy according to the invention achieves superior creep resistance, superior corrosion resistance, low hydrogen uptake, and low neutron absorption cross section by the selection of alloying elements for the zirconium alloy, especially including the addition of oxygen as an alloying element at a level beyond the levels currently used commercially for zirconium alloys.

The invention is based in part upon the theory that, in order to achieve good corrosion resistance, the composition of the alloy is selected such that, as far as possible, an addition of the different levels of the alloying element does not result in precipitation of new phases in the microstructure apart from the usual zirconium-iron-chromium and zirconium-iron-nickel precipitates observed in commercial Zircaloy alloys. The reasons for selecting specific levels of the different alloying elements are given below, and the composition of the alloy according to the invention is shown in Table 1.

The alloy of the present invention thus includes tin in a range of 0.4 to 1.0 wt. % and typically 0.5 wt. %. The alloy also has iron in a range of 0.3 to 0.6 percent, and typically 0.46 wt. %; chromium in a range of 0.2 to 0.4 wt. % and typically 0.23 wt. %; nickel is present in a range of from a measurable amount up to 0.06 wt. %, and typically 0.03 wt. %; silicon is in a range of 50 to 200 parts per million (ppm) and typically 100 ppm, and oxygen is in a range of from 1200 to 2500 ppm and typically 1800 to 2200 ppm.

Tin (Sn)

A decrease in the tin level below the 1.2 wt. % lower limit in Zircaloy-4 improves its corrosion resistance.[1] However, the trend of the mechanical property data regarding the influence of tin content on the thermal creep of zirconium alloys at 400° C. indicates that a decrease in tin level will degrade the creep resistance of zirconium alloys.[2] The selected range of tin level of 0.4 to 1.0 wt. % tin is expected to provide a combination of good corrosion resistance and good creep resistance for the alloy of the invention. The superior creep resistance and corrosion resistance are also provided by the higher levels of iron, chromium, nickel and oxygen described below. The results presented in reference (1) imply that an alloy with a tin level of 0.5 wt. %, a high level of iron of 0.46 wt. %, silicon at 100 ppm, and an iron/chromium ratio of 2 is expected to show superior corrosion resistance.

Iron (Fe)

The corrosion resistance of Zircaloy-2 and iron alloys in 360° C. water depends on the iron level.[3] Since the best corrosion resistance in 360° C. water was observed with 0.45 percent iron, in order to achieve a good corrosion resistance in such water, a level of 0.46 wt. % iron was selected for the new alloy of the invention. Such a higher level of iron will also enhance the creep resistance of the alloy.

Chromium (Cr)

Chromium is mainly added to improve the strength and creep resistance of the new alloy according to the invention. (Iron+chromium) in the range of 0.3 to 0.7 wt. % is useful in improving mechanical properties of the alloy without degradation of the corrosion resistance, according to the recent results of Isobe and Matsuo.[4] Thus, the chromium range of 0.2 to 0.4 wt. %, and typically 0.23 percent was selected for the new alloy. Thus, the (iron+chromium) level selected for the alloy of the invention is in the range suggested by Isobe and Matsuo.

Nickel (Ni)

The addition of nickel in an amount from a measurable amount indicating its positive presence to 0.06 wt. % and typically in an amount up to 0.03 percent is to improve the high temperature corrosion resistance of the new alloy according to the invention. The amount of nickel is limited to avoid possible increase in the hydrogen absorption by the alloy.

Silicon (Si)

The silicon, in a range of 50 to 200 ppm, and typically at 100 ppm, is added as an alloying element to reduce the hydrogen absorption by the alloy and also to reduce the variation of the corrosion resistance with variations in the processing history of the alloy.[1]

Oxygen (O)

Oxygen, in a range of 1200 to 2500 ppm, and typically 1800 to 2200 ppm, is added as a solid solution strengthening alloying element and creep strengthener. The optimum level of oxygen will be controlled by the fabricability of the alloy.

Thus, the invention of the new alloy described in this specification achieves superior creep resistance, superior corrosion resistance, and low neutron absorption cross section by its selected composition, and especially by the addition of oxygen as an alloying element beyond the levels currently commercially used for zirconium alloys. The higher levels of alloying elements generally improve the strength and creep resistance of zirconium alloys with a concurrent degradation of the corrosion resistance. A new zirconium alloy, according to this invention, with optimum levels of tin, iron, chromium, nickel, silicon and oxygen is proposed that provides a good combination of mechanical properties and corrosion resistance as a result of a predominantly single phase microstructure.

Still further, in-reactor creep resistance for the alloy of the invention has been enhanced by the addition of oxygen. The thermal creep rate of α-phase Zircaloy-2 is reduced by the addition of oxygen [5]. The addition of oxygen is expected to further decrease the irradiation component of creep due to the interaction between oxygen atoms and irradiation induced defects [6]. The effect of 2500 ppm addition of oxygen on the corrosion resistance of the zirconium base alloy is expected to be insignificant [7].

Finally, the hydrogen uptake fractions demonstrated by the alloys according to the invention are significantly lower than those associated with conventional Zircaloy-4 and dilute zirconium alloys without the higher levels of oxygen specified in the composition of this invention.

EXAMPLE 1

The hydrogen uptake fraction in long-term autoclaved specimens of the typical composition alloy shown in Table 1 was measured. The specimens indicated in Table 2 were autoclaved in 360 degree C. water in a static autoclave for an exposure period as shown. Specimen A is a commercially-available Zircaloy-4 alloy, while Specimen B is a dilute zirconium alloy without the higher level of oxygen specified in the alloy according to the invention. Specimens C and D have alloy compositions within the typical composition range covered by the alloy of the invention shown in Table 1 where Specimen C has 1800 ppm oxygen, and Specimen D has 2200 ppm. The time of the exposure of the respective alloys is shown in days, with measurements of the weight gain in mg/dm2. The hydrogen uptake fractions (based on the measured hydrogen content and the total hydrogen evolved due to the corrosion reaction) are significantly lower than those associated with conventional Zircaloy-4 and also the dilute zirconium alloy without the high levels of oxygen addition. The hydrogen uptake data are presented in Table 2. It thus appears that oxygen addition to the 1800 to 2200 ppm typical level helps to reduce the hydrogen uptake of the proposed alloy.

BIBLIOGRAPHY (1) Eucken C. M., Finden, P. T. Trapp—Pritsching, S. and Weidinger, H. G., "Influence of Chemical Composition on Uniform Corrosion of Zirconium Base Alloys in Autoclave Tests", *Zirconium in the Nuclear Industry Eighth International Symposium*, ASTM STP 1023, L. F. P Van Swam and C. M. Eucken, Eds.; American Society for Testing and Materials, Philadelphia, 1989, pp. 113–127.

(2) McInteer, W. A., Baty, D. L. and Stein, K. O., "The Influence of tin content on the Thermal creep of Zircaloy-4", *Zirconium in the Nuclear Industry, Eighth International Symposium*, ASTM STP 1023, L. F. P. Van Swam and C. M. Eucken, Eds.; American Society for Testing and Materials, Philadelphia, 1989 pp. 621–640.

(3) Scott, D. B., "Notes on the Corrosion Behavior of Zircaloy-2 with various levels of iron content," *Zirconium Highlights*, WAPD-ZH-24, p. 11, (1960).

(4) Isobe, T. and Matsuo, Y., "Development of High Corrosion Resistance Zirconium-base Alloys", *Zirconium in the Nuclear Industry, Ninth International Symposium*. ASTM STP 1132, C. M. Eucken and A. M. Garde, Eds., American Society for Testing Materials, Philadelphia, 1991, pp. 346–367.

(5) Burton, B., Donaldson, A. T., and Reynolds, G. L., "Interaction of Oxidation and Creep in Zircaloy-2", ASTM STP 681, 1979, pp. 561–585.

(6) Adamson, R. B., and Bell, W. L., "Effects of Neutron Irradiation and Oxygen Content on the Microstructure and Mechanical Properties of Zircaloy", *Microstructural and Mechanical Behavior of Materials*, Vol. 1, G. Haicheng and H. Jiawen, Editors; Engineering Materials Advisory Services, UK, 1985, pp. 237–246.

(7) Korobkov, I. I., "A Study of the Process of Oxidation of Zirconium-Oxygen Alloys", Akademiia Nauk USSR, Izvestiia, Metally, May–June 1973, pp. 110–115.

TABLE 1

Preferred Embodiment Modified Zirconium Alloy

| | Range | Typical |
|---|---|---|
| Tin, Wt. % | 0.4 to 1.0% | 0.5% |
| Iron, Wt. % | 0.3 to 0.6% | 0.46% |
| Chromium, Wt. % | 0.2 to 0.4% | 0.23% |
| Nickel, Wt. % | Measurable amount up to 0.06% | 0.03% |
| Silicon, ppm | 50 to 200 ppm | 100 ppm |
| Oxygen, ppm | 1200 to 2500 ppm | 1800 to 2200 ppm |

TABLE 2

Hydrogen Content and Hydrogen Uptake Fractions of Zirconium Alloy Specimens Autoclaved in 360° C. Water Static Autoclave

| | | Autoclave Test | | Hydrogen | |
|---|---|---|---|---|---|
| Specimen | Composition | Exposure, Days | Weight Gain, mg/dm$^2$ | Content, ppm | Uptake Fraction, % |
| A | Zircaloy-4 | 707 | 242 | 512 | 33.3 |
| B | 0.5% Sn 0.33% Fe 0.17% Cr 0.02% Nb | 1599 | 301 | 544 | 33.7 |
| C | 0.45% Sn 0.5% Fe 0.25% Cr 0.180% Oxygen | 320 | 54 | 71 | 21.5 |
| D | 0.50 Sn % 0.5% Fe 0.25% Cr 0.220% Oxygen | 320 | 54 | 58 | 17.5 |

We claim:

1. A zirconium alloy for use in light water nuclear core structure elements and fuel cladding, which comprises an alloy composition as follows:
   tin, in a range of 0.4 to 1.0 wt. %;
   iron, in a range of 0.3 to 0.6 wt. %;
   chromium, in a range of 0.2 to 0.4 wt. %
   nickel, in a range of up to 0.06 wt. %;
   silicon, in a range of 50 to 200 ppm; and oxygen, in a range of 1200 to 2500 ppm; and
the balance being of zirconium.

2. The alloy composition as set forth in claim 1, wherein said tin is typically about 0.5 wt. %.

3. The alloy composition as set forth in claim 1, wherein said iron is typically about 0.46 wt. %.

4. The alloy as set forth in claim 1, wherein said chromium is about 0.23 wt. %.

5. The alloy as set forth in claim 1, wherein said nickel is about 0.03 wt. %.

6. The alloy as set forth in claim 1, wherein said silicon is about 100 ppm.

7. The alloy as set forth in claim 1, wherein said oxygen is about 1800 to 2200 ppm.

8. The alloy as set forth in claim 1, wherein said alloy is irradiated in use.

9. The alloy as set forth in claim 7, wherein said oxygen level reduces hydrogen uptake for said alloy as compared to conventional Zircaloy-4.

10. A zirconium alloy for use in light water nuclear core structure elements and fuel cladding, which comprises a composition which includes tin in a range of 0.4 to 1.0 wt. % to improve corrosion resistance of said alloy in combination with iron in a range of 0.3 to 0.6 wt. %; chromium in a range of 0.2 to 0.4 wt. %; and alloying elements including nickel present in a range of a measurable amount to 0.06 wt. % to enhance the high temperature corrosion resistance of the alloy, silicon in a range of 50 to 200 ppm to reduce the hydrogen absorption by the alloy and to reduce variation of corrosion resistance with variation in the processing history of the alloy, oxygen in a range of 1200 to 2500 ppm as a solid solution strengthening alloying element; and the remainder zirconium.

11. The alloy composition as set forth in claim 10, wherein said tin is typically about 0.5 wt. %.

12. The alloy composition as set forth in claim 10, wherein said iron is typically about 0.46 wt. %.

13. The alloy as set forth in claim 10, wherein said chromium is about 0.23 wt. %.

14. The alloy as set forth in claim 10, wherein said nickel is about 0.03 wt. %.

15. The alloy as set forth in claim 10, wherein said silicon is about 100 ppm.

16. The alloy as set forth in claim 10, wherein said oxygen is about 1800 to 2200 ppm.

17. The alloy as set forth in claim 10, wherein said alloy is irradiated in use.

18. The alloy as set forth in claim 10, wherein said oxygen level reduces hydrogen uptake compared to Zircaloy-4.

19. A zirconium alloy consisting essentially of the following composition:
tin, in a range of 0.4 to 1.0 wt. %;
iron, in a range of 0.3 to 0.6 wt. %;
chromium, in a range of 0.2 to 0.4 wt. %
nickel, present in a range from a measurable amount to 0.06 wt. %;
silicon, in a range of 50 to 200 ppm;
oxygen, in a range of 1200 to 2500 ppm; and
the balance being of zirconium.

20. A zirconium alloy which comprises a composition consisting essentially of tin in a range of 0.4 to 1.0 wt. % to improve corrosion resistance of said alloy in combination with iron in a range of 0.3 to 0.6 wt. %; chromium in an amount in a range of 0.2 to 0.4 wt. %; and further comprising alloying elements including nickel present in a range of from a measurable amount to 0.06 wt. % to enhance the high temperature corrosion resistance of the alloy, silicon in a range of 50 to 200 ppm to reduce the hydrogen absorption by the alloy and to reduce variation of corrosion resistance with variation in the processing history of the alloy, and oxygen in a range of 1200 to 2500 ppm as a solid solution strengthening alloying element; and the remainder zirconium.

21. The alloy composition as set forth in claim 20, consisting essentially of said alloying elements.

* * * * *